US012225357B2

(12) United States Patent
Glenn et al.

(10) Patent No.: US 12,225,357 B2
(45) Date of Patent: Feb. 11, 2025

(54) CABLE ALIGNMENT FEATURES IN A CUSTOM-FITTED HEARING DEVICE SHELL

(71) Applicant: STARKEY LABORATORIES, INC., Eden Prairie, MN (US)

(72) Inventors: Janet Glenn, Minneapolis, MN (US); Toto Saykeo, Eden Prairie, MN (US); Craig Feldsien, Eden Prairie, MN (US); Justin Barlow, Minneapolis, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 381 days.

(21) Appl. No.: 17/893,359

(22) Filed: Aug. 23, 2022

(65) Prior Publication Data

US 2023/0065068 A1 Mar. 2, 2023

Related U.S. Application Data

(60) Provisional application No. 63/239,208, filed on Aug. 31, 2021.

(51) Int. Cl.
*H04R 25/00* (2006.01)
*H01R 24/56* (2011.01)

(52) U.S. Cl.
CPC ........... *H04R 25/652* (2013.01); *H01R 24/56* (2013.01)

(58) Field of Classification Search
CPC .............................. H04R 25/652; H01R 24/56
See application file for complete search history.

(56) References Cited

U.S. PATENT DOCUMENTS

| | | | | |
|---|---|---|---|---|
| 8,885,858 B2 | 11/2014 | Nielsen | | |
| 10,284,975 B2 | 5/2019 | Higgins et al. | | |
| 11,375,326 B2 | 6/2022 | Blumer et al. | | |
| 2003/0074174 A1 | 4/2003 | Fu | | |
| 2004/0107080 A1 | 6/2004 | Deichmann | | |
| 2007/0242845 A1* | 10/2007 | Westermann | H04R 25/658 | 381/330 |
| 2009/0074221 A1* | 3/2009 | Westermann | H04R 25/65 | 381/327 |
| 2010/0086161 A1* | 4/2010 | Ilic | H04R 25/65 | 381/330 |
| 2011/0110544 A1* | 5/2011 | Vestergaard | H04R 25/658 | 427/255.7 |

(Continued)

FOREIGN PATENT DOCUMENTS

| | | | | |
|---|---|---|---|---|
| KR | 102316908 | 10/2021 | | |
| WO | WO-2018099562 A1 * | 6/2018 | H04R 25/659 | |

OTHER PUBLICATIONS

U.S. Appl. No. 17/889,064; Office Action issued Jul. 31, 2024; Examiner: George C. Monikang. 17 pages.

*Primary Examiner* — Sean H Nguyen
(74) *Attorney, Agent, or Firm* — Mueting Raasch Group

(57) ABSTRACT

An ear-wearable electronic device includes a shell with a cable retention slot. The cable entrance slot has an interior end and an exterior end. A bend surface extends from the exterior end of the cable retention slot to an exterior surface of the shell. The bend surface aligned with a crux of a user's ear when the ear-wearable device is installed in an ear of the user's ear. The shell may include a uniquely-shaped outer surface that corresponds uniquely to an ear geometry of the user of the ear-wearable device.

19 Claims, 16 Drawing Sheets

(56) References Cited

U.S. PATENT DOCUMENTS

| | | | | |
|---|---|---|---|---|
| 2019/0208304 | A1 | 7/2019 | Cohen et al. | |
| 2021/0044910 | A1* | 2/2021 | Kuipers ............... | H04R 25/652 |
| 2022/0174432 | A1 | 6/2022 | Silberzahn | |
| 2022/0257186 | A1* | 8/2022 | Stewart ................ | H04R 25/658 |

* cited by examiner

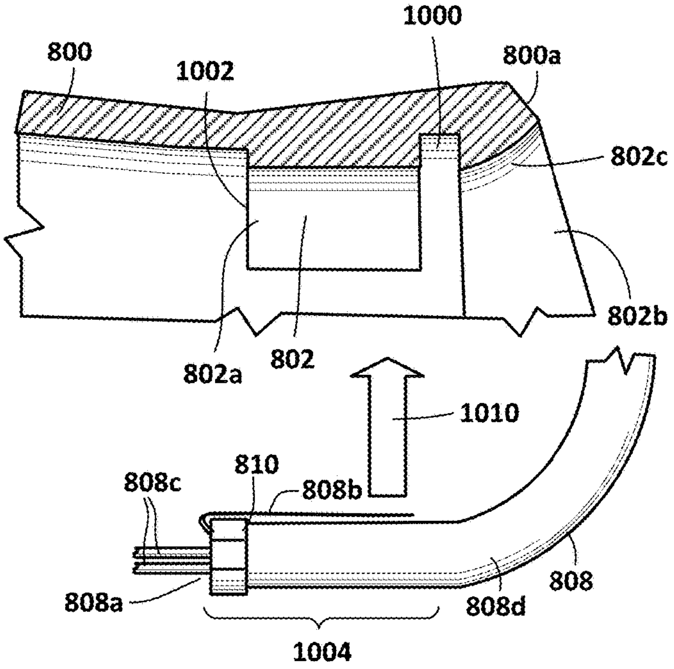
FIG. 10
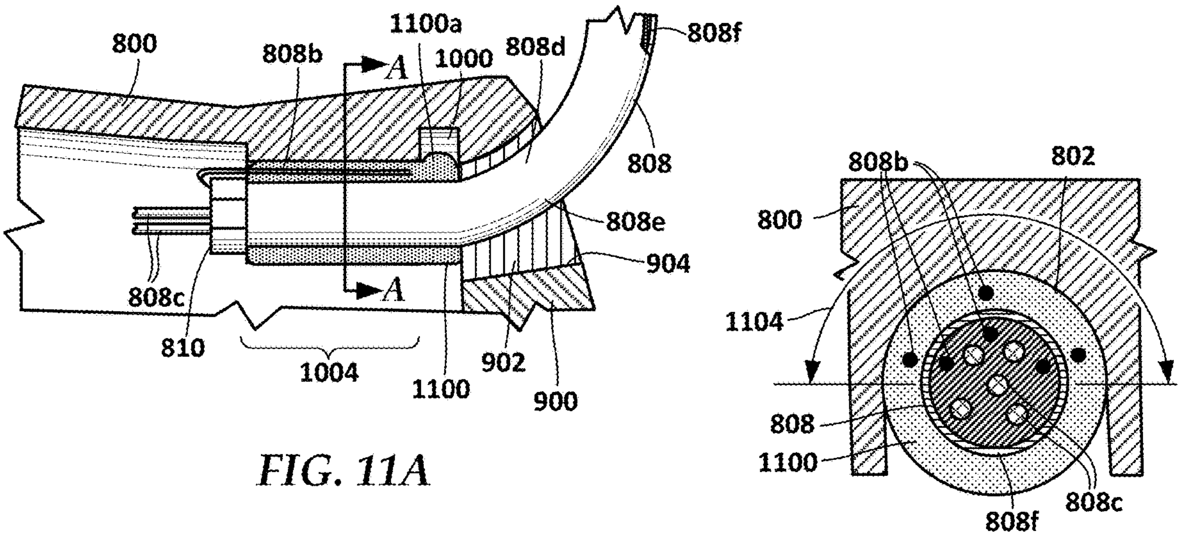
FIG. 11A
Section A-A
FIG. 11B

CABLE ALIGNMENT FEATURES IN A CUSTOM-FITTED HEARING DEVICE SHELL

RELATED PATENT DOCUMENTS

This application claims the benefit of U.S. Provisional Application No. 63/239,208, filed on Aug. 31, 2021, which is incorporated herein by reference in its entirety.

SUMMARY

This application relates generally to ear-level electronic systems and devices, including hearing aids, personal amplification devices, and hearables. For example, a custom-fitted, hearing device shell includes cable alignment features that ensure a good fit and a long wear life. In one embodiment, an ear-wearable electronic device includes a shell with a cable retention slot. The cable entrance slot has an interior end and an exterior end. A bend surface extends from the exterior end of the cable retention slot to an exterior surface of the shell. The bend surface is aligned with a crux of a user's ear when the ear-wearable device is installed in an ear of the user's ear.

In another embodiment, an ear-wearable electronic device includes a shell having a uniquely-shaped outer surface that corresponds uniquely to an ear geometry of a user of the ear-wearable device. The shell includes a cable retention slot with an interior end and an exterior end. The shell includes a a bend surface extending from the exterior end of the cable retention slot to an exterior surface of the shell. The bend surface aligned with a crux of a user's ear when the ear-wearable device is installed in an ear of the user. The shell also includes a faceplate void that has a curved and beveled perimeter edge. The faceplate void facilitates access to one or more devices installable into the shell. The cable retention slot intersects the perimeter edge.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

FIGS. 10, 11A and 11B are cross-sectional views showing cable retention features according to an example embodiment;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
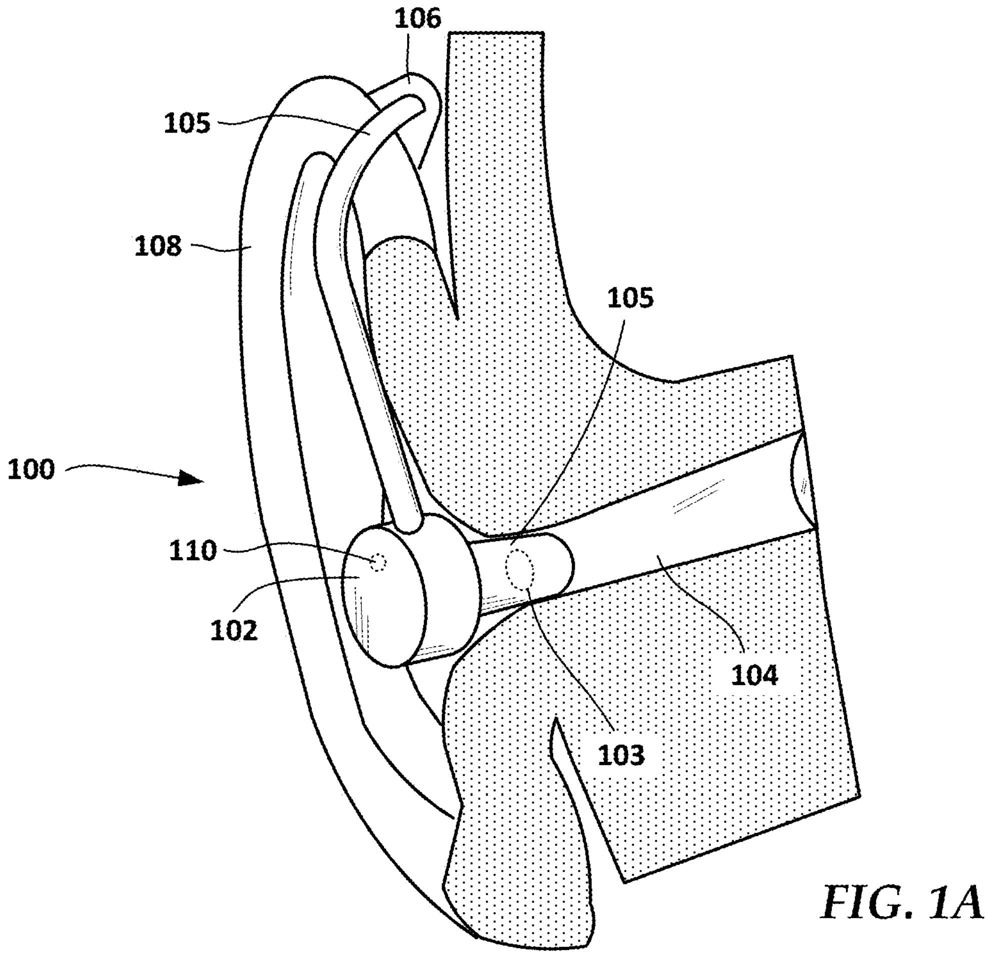
FIG. 1A is an illustration of a hearing device according to an example embodiment.

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Custom fitted hearing devices can result in ear-worn electronics with enhanced performance and comfort. A custom-fitted device may be formed, for example, by taking a mold of the user's ear and then using the mold to create a device that fits the exact contour of the user's ear. Technological developments such as three-dimensional (3D) scanning and 3D printing can increase the dimensional accuracy of custom-fitted device compared to, for example, molding of the part. Also, 3D scanning and 3D printing can increase the speed and ease with which the ear-wearable devices can be produced. This allows creating an organically shaped shell for the device that is custom fit to the individual's ear geometry to a high accuracy, e.g., within 0.1 mm.

One application of interest in ear-wearable technologies is the sensing of biometric data in the ear. Through direct contact with the surfaces of the outer ear, e.g., near the ear canal, sensors can accurately detect body temperature, pulse rate, and other metrics related to blood flow, such as blood oxygen level. This can be useful in hearing-aid devices, which are intended for long-term wear and so can unobtrusively gather health data over long-periods of time while at the same time performing its primary function of conditioning and amplifying sounds into the ear.

It has become increasingly cost-effective to perform in-ear sensing in ear-wearable devices due to the availability of low-cost yet accurate micro-sensors. An ear-wearable hearing aid will already have at least a microphone for sensing sound that is to be amplified. Other sensors may also be used in such, such as accelerometers, temperature sensors, etc., which can improve the accuracy of the sound reproduction via digital signal processing. Thus ear-wearable device architectures already include electronics (e.g., microprocessor, digital signal processors) capable of receiving and processing sensor data, and so these devices are amenable to adding biometric sensors, including biometric sensors that contact the skin within the ear.

One issue with using surface mounted sensors in the ear is that it can be difficult to position such sensors on a custom-fitted shell. If the device shell is of a standard shape, such as a tapered cylinder, it is possible to use a standard, interchangeable sensor on a whole class of devices. For example, if ten different sizes/configurations are desired, then ten different designs can be produced, in some cases automatically, e.g., using parametric computer-aided modeling. Further, it may be cost effective to use injection molding for producing those sets of shells, which is one of the cheapest methods for making a large number of devices out of plastics.

If a custom-fitted shell is desired, then the advantages of mass production manufacturing may not available. Generally, a production run for a custom fit part could just be one or two, thus traditional production methods such as injection molding would be cost prohibitive. One way of implementing a custom fit earpiece is to use a custom-fitted cover that is fitted over the end of a standard shape shell. However, such an arrangement would not be ideal for surface-mounted sensors that contact the skin, as sensors would be mounted in the shell and not the cover, and thus could not achieve direct contact. Accordingly, a system for producing individually fitted ear-wearable devices is described below, such devices utilizing ear-canal sensors that are custom placed for each ear for which it is fitted. The system allows the design and production of custom-fitted ear-wearables that utilize interchangeable sensors placed at or near a surface of the device shell for direct contact measurements. The device shells can have other features that are also customize-fitted, such as cable retention features. Such devices can be produced at scale at reasonable cost.

In FIG. 1A, a diagram illustrates an example of an ear-wearable device 100 according to an example embodiment. The ear-wearable device 100 includes an in-ear portion 102 that fits into the ear canal 104 of a user/wearer. The ear-wearable device 100 may also include an external portion 106, e.g., worn over the back of the outer ear 108. The external portion 106 is electrically coupled to the internal portion 102. The in-ear portion 102 may include an acoustic transducer 103, where it is acoustically coupled to the ear canal 104, e.g., via a cable 105. The acoustic transducer 103 may be referred to herein as a “receiver,” “loudspeaker,” etc., however could include a bone conduction transducer. One or both portions 102, 106 may include an external microphone, as indicated by microphone 110. The configuration shown in FIG. 1A is referred to as receiver-in-canal (RIC), in that the receiver 103 is located in or proximate the ear canal 104, while other electronics are housed in the external portion 106, all being electrically coupled by the cable 105.

Other components of hearing device 100 not shown in the figure may include a processor (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1A shows one example of an ear-wearable device, often referred to as a hearing aid (HA), the term hearing device of the present disclosure may refer to a wide variety of ear-level electronic devices that can aid a person with impaired hearing. This includes devices that can produce processed sound for persons with normal hearing. Some features described herein that are implemented in a RIC hearing device may also be used in other devices, such as behind-the-ear (BTE), in-the-ear (ITE), in-the-canal (ITC), invisible-in-canal (IIC), receiver-in-the-ear (RITE) or completely-in-the-canal (CIC) type hearing devices or some combination of the above. Throughout this disclosure, reference is made to a “hearing device” or “ear-wearable device,” which is understood to refer to a system comprising a single left ear device, a single right ear device, or a combination of a left ear device and a right ear device.

In existing RIC designs, the in-ear portion 102 can be quite small, just housing the receiver 103 and possibly the microphone 110, while all other electronics are located in the external portion 106. Although the external portion 106 could include biometric sensors, the in-ear portion 102 is the best place to incorporate these sensors. The external portion 106 may still be needed, as it would be less than ideal to locate all the electronics and power supply in a custom, in-ear, shell. Thus, the designs described herein include an external portion 106 (also referred to as a RIC body) with a custom fitted in-ear portion (also referred to as sensor shell). The combination of the external portion 106 and a custom shell in-ear portion 102 can be used to produce a hearing device with health/biometric sensors.

Figure 1B:
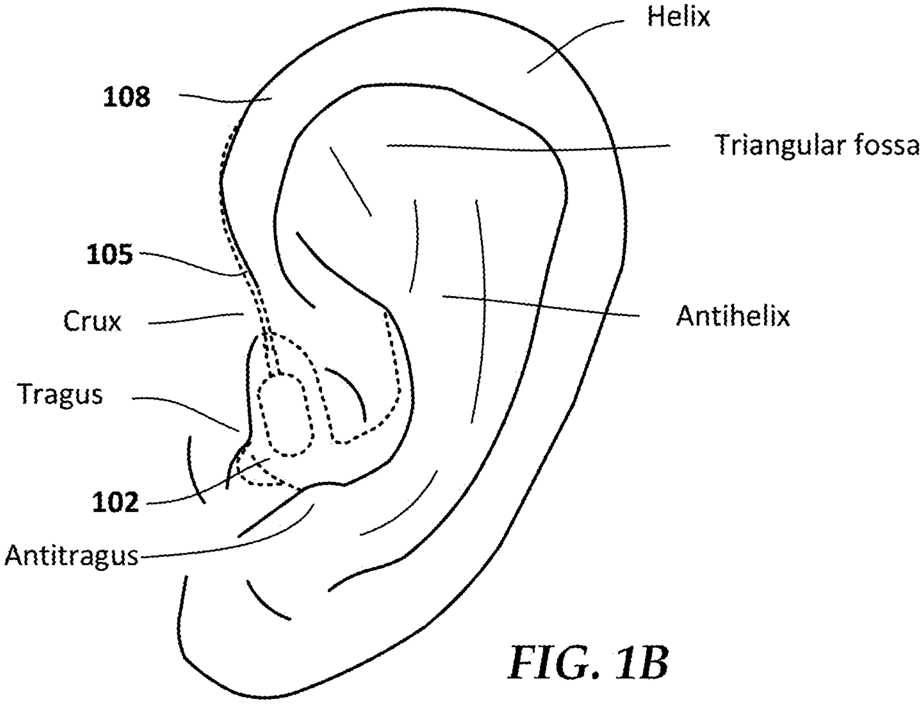
FIG. 1B is an illustration of ear geometry applicable to a hearing device.

As noted above, one challenge in making custom fitted ear-wearable devices that can be produced at scale involve integrating sensors into the complex, organically shaped outer shell that is unique for each ear. Another challenge is aligning other components with the ear, such as cables that extend from the devices. In FIG. 1B, a diagram of the outer ear 108 shows a part of the cable 105 extending from the in-ear portion 102 along the crux of the ear (also referred to as the external auditory meatus). The in-ear portion 102 and cable 105 are drawn in dashed lines to distinguish from the counter of the user’s ear 108. The location and dimensions of the crux will differ slightly for every ear, but for optimum comfort and fit, the cable 105 should be aligned with the crux within a few degrees as it exits the in-ear portion 102.

Figure 2:
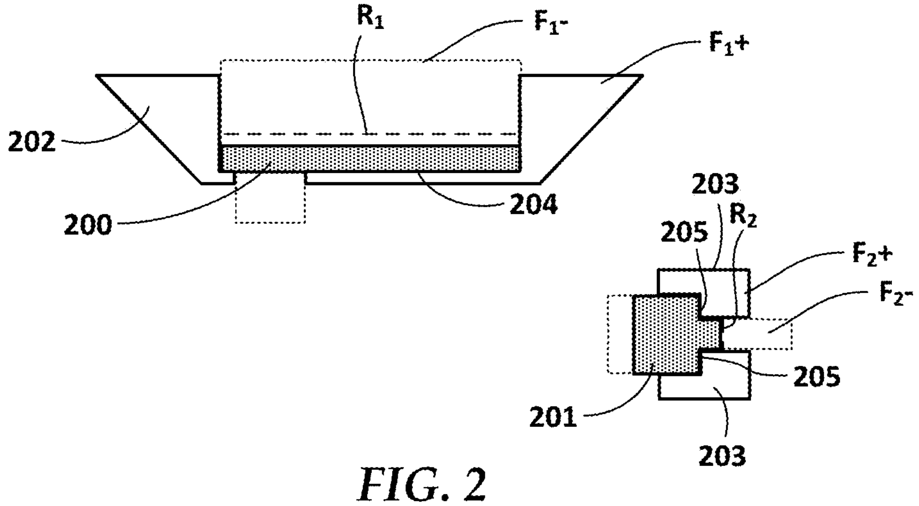
FIGS. 2-7 are two-dimensional diagrams illustrating how mounting structures are integrated with a custom-fit shell according to an example embodiment.

In FIGS. 2-7, a series of diagrams illustrate how objects such as cables and sensors with predefined and unchanging geometry can be integrated into a shell that has a different geometry for each ear in which it is used. As seen in FIG. 2, two sensors 200, 201 are shown in a simplified, two-dimensional (2D) view. For each of these sensors 200, 201, geometry of mounting structures 202, 203 is defined, e.g., in a computer aided drawing (CAD) system. The mounting structures 202, 203 are used for mounting the sensors 200, 201, although the final geometry of each mounting structure 202, 203 will differ due to the integration of the structures into a custom shell. Thus, an initial geometry of the mounting structure 202, 203 is shown in FIG. 2, this initial geometry exceeding the final dimensions of the structures when they are integrated into the shell.

The initial geometry of the structures 202, 203 includes positive features $F_1$+ and $F_2$+, a part of which are added to the shell and negative features $F_1$− and $F_2$−, a part of which that are subtracted from the shell. The positive features $F_1$+ and $F_2$+, are drawn in solid lines and the negative features $F_1$− and $F_2$− are drawn in dashed lines. Note that the structures 202, 203 are initially over-defined, in that they include more positive features that will eventually be used in the final design. In other words, some of the positive features will be later removed by negative features defined by the shell geometry.

The geometry of mounting structures 202, 203 also includes reference features $R_1$, $R_2$ that are defined relative to a mounting feature of the structures 202, 203. For example, feature $R_1$ is offset from mounting plane 204 and reference feature $R_2$ is offset from mounting shoulders 205. The reference features $R_1$, $R_2$ are used to position the feature geometry relative to a corresponding feature on the shell. In this example, the reference features $R_1$, $R_2$ would be placed at or below a threshold distance from an outer feature of the shell, which ensures that the associated sensors 200, 201 are appropriately placed, e.g., close to the outer surface of the shell without extending beyond the outer surface of the shell. In order to prevent the sensors 200, 201 from extending beyond the outer surface of the shell, the reference features $R_1$, $R_2$ may be selected to ensure the sensors 200, 201 are below the outer surface of the shell even given a worst-case tolerance deviation of sensor and shell geometry. Any gaps between the outer sensor surfaces and the shell outer surface can be smoothed using a filler or coating as described below. In some other embodiments, one of the sensors 200, 201 may protrude from the shell, in which case the reference features may be selected for a target orientation such that a surface of the sensor extends out of the outer surface of the shell by a protrusion distance into the ear surface.

Figure 3:
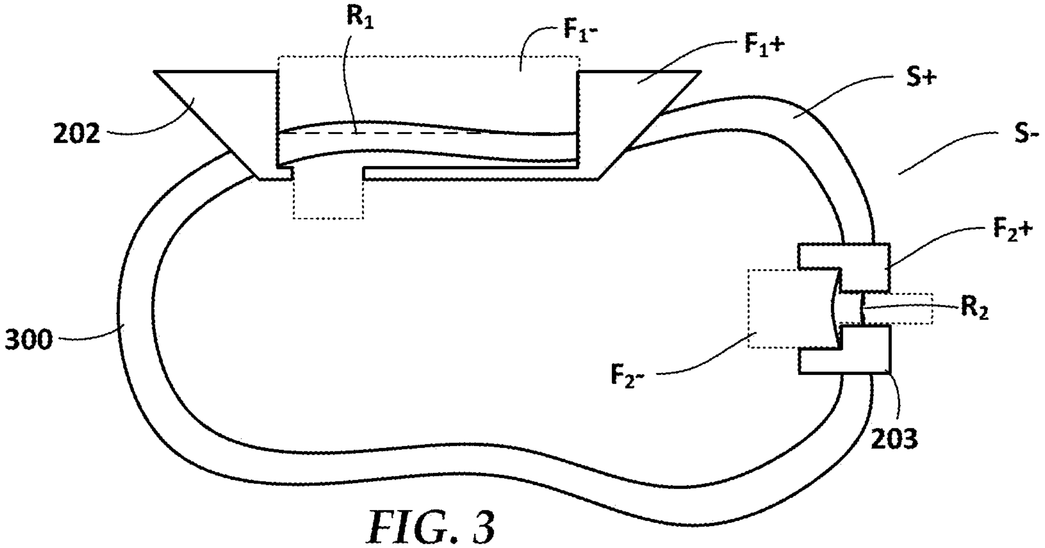
Figure 4:
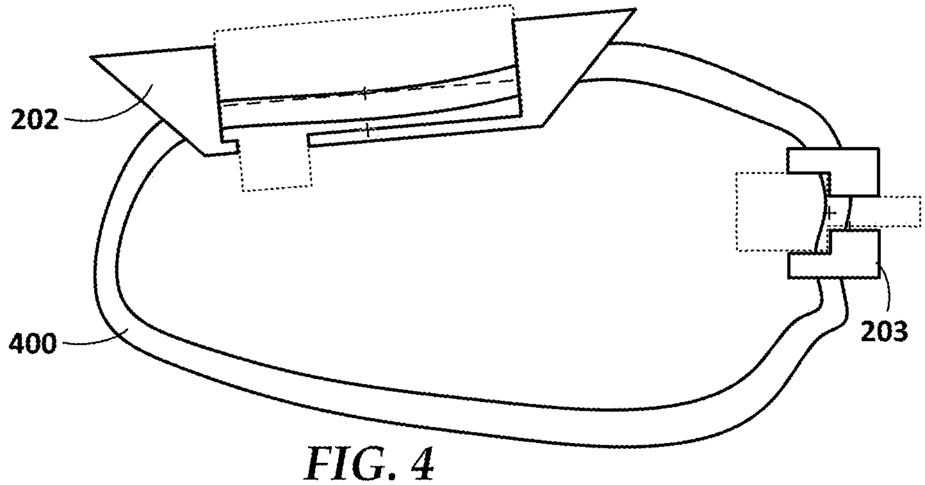

As seen in FIG. 3, a shell structure 300 is defined based on a specific ear geometry. The shell structure 300 is also represented by positive and negative features S+, S−, which generally define a thin-walled structure that encloses an inner volume. Note that the negative feature S− surrounds the outer surface of the shell structure 300, as the outer counters of the structure should remain mostly unchanged after adding mounting structures and sensors. As seen in FIG. 4, another shell 400 is similarly defined, this other shell 400 uniquely corresponding to a different ear geometry.

Figure 5:
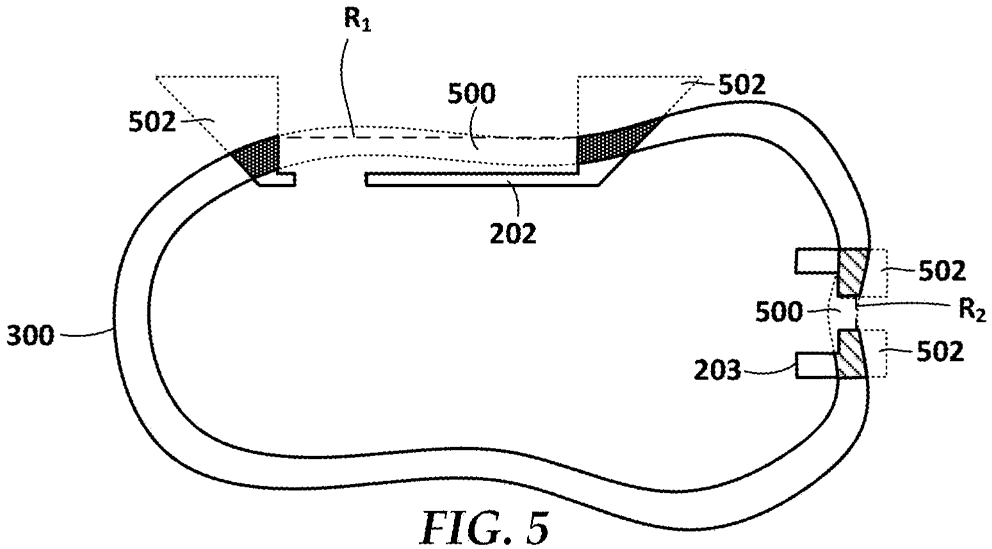

In FIG. 5, a diagram shows how a union operation affects the shell 300 and mounting structures 202, 203. For purposes of this disclosure, a union between a negative feature and a positive feature results in subtracting the negative feature from the positive feature. If a positive feature occupies the same space as another positive feature, they are merged. All positive features that do not intersect any other positive or negative features are left as is, and all positive features left over after the union are merged into a single, contiguous structure.

Figure 6:
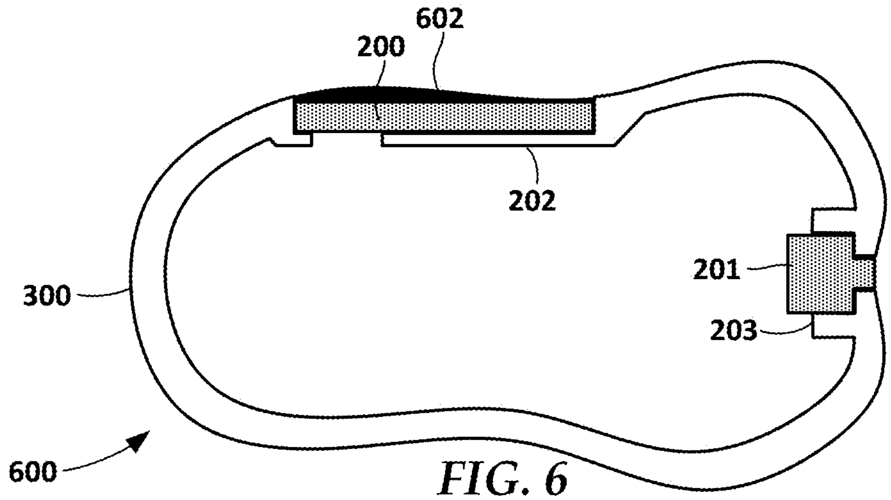
Figure 7:
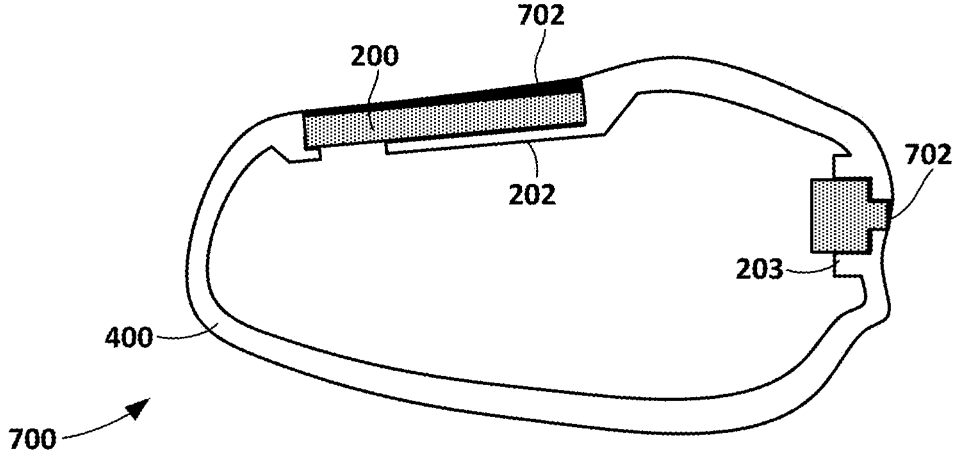

In FIG. 5, regions 500 represent parts of the original shell structure 300 that were removed by the negative features of the mounting structures 202, 203. Regions 502 represent parts of the mounting structures that were removed by the negative features of the shell structure 300. The shaded regions represent intersections between the mounting structures 202, 203 and the shell structure 300. In FIG. 6, a diagram shows the final shell 600 with the mounting structures 202, 203 integrated into the shell structure 300 as a single, contiguous structure. The sensors 200, 201 are also shown fixably mounted via the mounting structures 202, 203, and may be secured by adhesives or other fixable mounting means. Note that a final smooth contour may be formed using a coating, e.g., skim coating 602 as shown over sensor 200, and which may also be applied over sensor 201, although not shown here. In FIG. 7, a diagram shows a final shell 700 with the mounting structures 202, 203 integrated into the different, unique, shell structure 400 shown in FIG. 4. The sensors 200, 201 and skim coatings 702 are also seen fixably mounted in FIG. 7.

As noted above, an in-ear shell incorporating biometric or health sensor will typically be coupled to an external portion via a cable. Therefore, the shell will incorporate mounting features that secure the cable to the shell. Because part of the shell will be visible in the user's ear, it is desirable to improve the aesthetic of the adhesive system for the cable while maintaining the desired robustness and reliability of the hearing device. In embodiments described below, this involves a specially designed cable exoskeleton and a shell-integrated cable retention that adheres the cable to the sensor shell.

Figure 8:
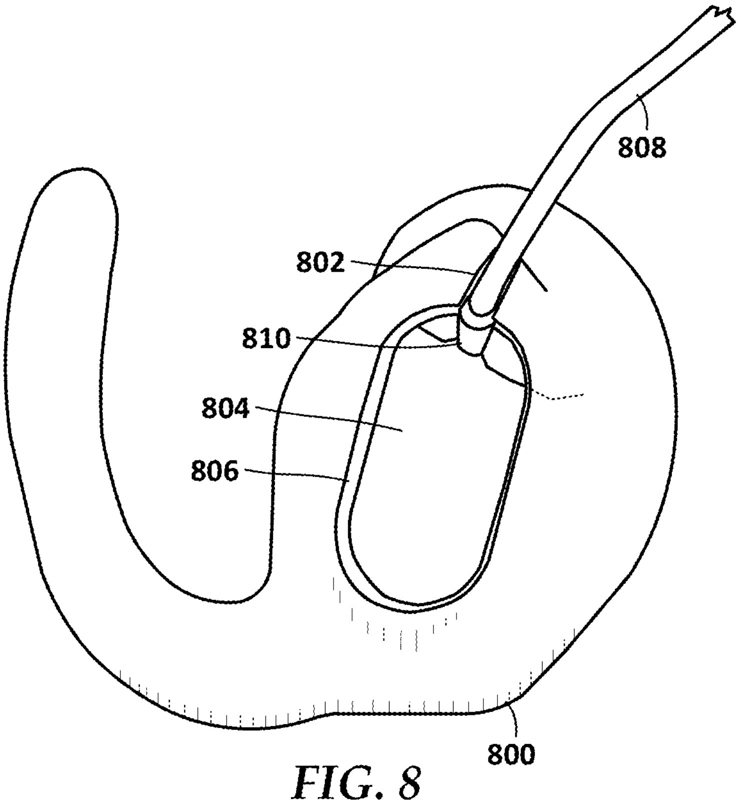
FIGS. 8 and 9 are perspective views showing cable retention and alignment features according to an example embodiment.

In FIG. 8, a perspective view shows cable retention features of an ear-wearable device according to an example embodiment. The ear-wearable electronic device includes a shell 800 with a cable retention slot 802. The shell 800 also optionally includes a faceplate void 804 that has a curved and beveled perimeter edge 806. The faceplate void 804 facilitates access to one or more devices installable into the shell 800. The cable retention slot 802 intersects the beveled perimeter edge 806, such that a cable 808 coupled to internal electronics (e.g., sensors, not shown) at a distal end can be introduced into the faceplate void 804. After the internal electronics are fastened to their respective mounting structures, the cable 808 can be secured into the cable retention slot 802.

The shell 800 can be 3D printed using a liquid resin process that utilizes a resin for audiology applications, such as provided by pro3dure® medical LLC, e.g., GR-1 resin. This resin may also be used for skim coating as described elsewhere herein. Various adhesives may be used to secure devices to the shell, such as rigid adhesives (e.g., Loctite® 4307) and silicone adhesives (e.g., Loctite® 5056). The shell 800 may be oriented during printing such that the faceplate void 804 is aligned with (e.g., facing) the build platform, with the canal tip 812 being the last scaffolding printed. This ensures that the more critical tolerances (e.g., those that can adversely affect fit in the ear) are formed in the X-Y dimensions and not in the Z-dimension, which is not as controllable due to the Z-dimension depending on the thickness of resin that is hardened by ultraviolet light for each layer. For example, Z-direction tolerance may be as high as 0.012" worst case, which is higher than the worst case tolerances in the X-Y directions.

The cable 808 may be made of a flexible plastic material that has a low durometer, is co-extruded, and has wire bundles and Kevlar strands for support. The cable retention slot 802 is designed to cradle the co-extruded cable 808, providing both strain relief support and direction the cable 808 in a desired direction as it exits the shell 800. There is a blunt 810 at a jacket-terminating end of the cable. As will be described in further detail below, the blunt 810 may be octagonally-shaped and includes features that indicated to the building technician how to axially locate the cable 808 within the shell 800. This sets the depth of the cable 808 within the shell 800. The cable 808 has a bend that is designed to be aligned with the crux of the ear where the cable 808 connects with the shell 800.

Figure 9:
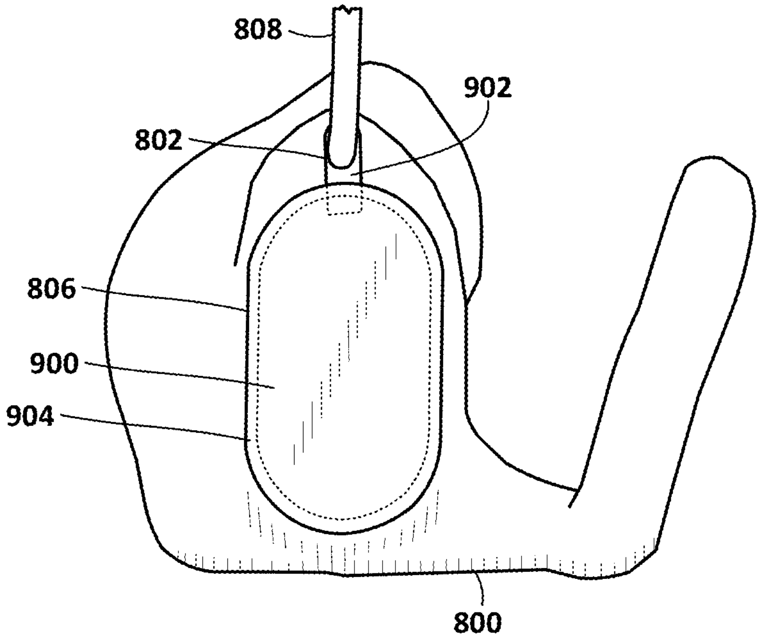

In FIG. 9, the shell 800 is shown with a faceplate 900 with a beveled edge 904 that mates with the perimeter edge 806. The faceplate 900 has an unbroken covering surface that matches the outer surface of the shell 800 surrounding the faceplate void 804 and traps the cable 808 into the cable retention slot 802. A biocompatible filler 902 (e.g., silicone or rigid adhesive) is backfilled into the cable retention slot 802 after the faceplate 900 is installed, which creates a gasket around the cable 808 at its exit point from the shell 800. The filler 902 seals off the shell 800 and acts as a strain relief. Using a material such as silicone (e.g., Loctite® 5056) for the filler 902 provides an aesthetically pleasing appearance even after the expected life-cycle of wear and tear on the ear-wearable device. However, using a rigid adhesive (e.g., Loctite® 4307) for the filler 902 can simplify the manufacturing process because this adhesive is used elsewhere in assembly as described below, which can save on labor and piece costs. Due to the design of the cable 808 described elsewhere herein (e.g., being coextruded with wires and Kevlar fibers), the instantaneous local rigidity of the cable sheath is increased. Thus, this cable design is not expected to collapse during bending, thereby maintaining its shape during its life cycle. This maintaining of shape during bending can reduce or eliminate abrasion failure from the rigid adhesive's sharp edges.

Figure 12:
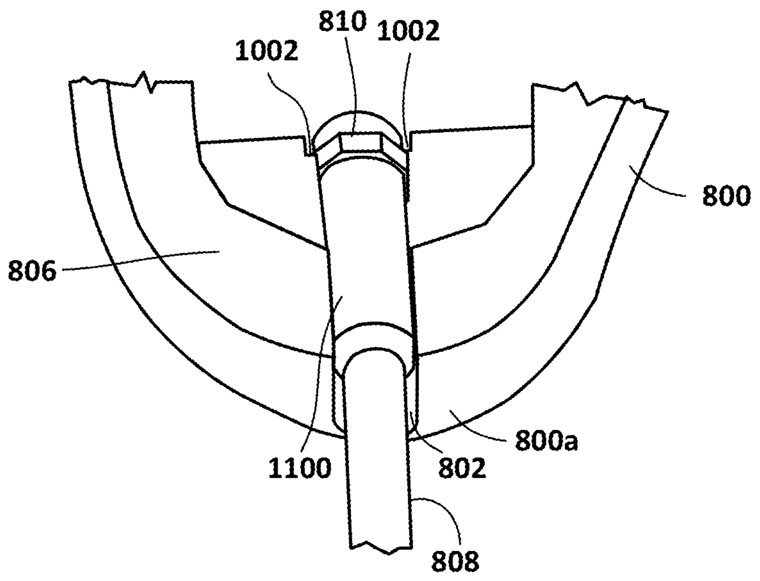
FIGS. 12-14 are perspective views showing additional cable alignment and retentions features according to an example embodiment.

In FIGS. 10, 11A and 11B, cross-sectional views of the shell 800 show additional details of cable retention features according to an example embodiment. FIG. 12 is a perspective view which shows some of the features from FIGS. 10 and 11A. In FIG. 11B, a cross sectional view corresponding to section line A-A in FIG. 11A shows details of the cable 808. In FIG. 10, the cable 808 is shown outside the cable retention slot 802 and is moved into place as indicated by arrow 1010 during assembly. This view shows an interior end 802*a* and an exterior end 802*b* of the cable retention slot 802. The cable retention slot 802 includes a bend surface 802*c* the extends from the exterior end 802*b* of the cable retention slot 802 to an exterior surface 800*a* of the shell 800. A glue reservoir 1000 is connected between the interior end 802*a* of the cable retention slot 802 and the bend surface 802*c*. As discussed below, a rigid adhesive 1100 (e.g., Loctite® 4307) seen in FIG. 11A adheres the cable 808 to the cable retention slot 802 near a terminating end 808*a* of the cable 808. The glue reservoir 1000 is operable to wick away excess portions 1100*a* of the rigid adhesive which prevents the excess portions 1100*a* from causing wear on the cable 808 proximate the bend. In some embodiments, the glue reservoir 1000 may have a minimum length of 0.020" along the axial direction of the cable 808.

As seen in the figure, a positioning surface 1002 is located at the interior end 802*a* of the cable retention slot 802. The blunt 810 at the jacket-terminating end 808*a* of the cable fits against the positioning surface 1002 and axially locates the cable 808 in the shell 800. This is best seen in FIG. 11A, where the cable 808 is shown glued into the cable retention slot 802 with adhesive 1100. As indicated by angle 1104 in FIG. 11B, the adhesive 1100 adheres about 180°-270° of the cable's outer surface to the surface of the cable retention slot 802. The rest of the cable's outer surface (outside of the retention slot 802) may also be covered with the adhesive 1100. In reference again to FIG. 11A, the filler 902 holds a first region 808*d* of the cable 808 into the cable retention slot 802 and holds a second region 808*e* of the cable 808 that faces away from the cable retention slot 802 to the faceplate 900. Note that in some embodiments, the first region 808*d* may have little to no filler 902.

The cable 808 further comprises strengthening fibers 808*b* co-extruded within a jacket 808*f* together with conductors 808*c*. The strengthening fibers 808*b* extend from the jacket-terminating end 808*a* and folded back over a fiber retention region 1004 at an outside surface of the jacket 808*f*. The fiber retention region 1004 in this example is between the cable jacket and the cable retention slot 802, which traps the fibers 808*b* between the slot and the cable 808. Note that the fibers 808*b* may extend along the side of the cable 808, as seen in FIG. 11B.

The rigid adhesive 1100 covers the strengthening fibers 808*b* and adheres the strengthening fibers 808*b* to the outside surface of the jacket 808*f* at the fiber retention region 1004. The strengthening fibers 808*b* may comprise Kevlar fibers or another material of equivalent strength. Together, the strengthening fibers 808*b*, rigid adhesive 1100, cable retention slot 802, filler 902 and faceplate 900 act as a system to provide strain relief to the cable 808, as well as seal the shell 800 to protect the inner electronic components from moisture, dust, etc.

Generally, the cable retention slot 802 and its associated features will protect the cable 808 from contact with sharp edges (e.g., resulting from dried adhesive) that could wear and tear the cable to failure over time. The arrangement provides good adhesion between the cable 808, the fibers 808*b*, and the shell 800. The glue reservoir 1000 allows the rigid adhesive 1100 to flow away from the cable 808, rendering the adhesion interface at low risk of damaging the cable 808. In addition, the glue reservoir 1000 also ensures the softer filler 902 provides the shell 800 with full protection against dust ingress as well as reducing cable fatigue failure. The smooth shaping of filler 902, e.g., where it blends with the curved surface of the shell 800, appears aesthetically pleasing even after the expected life-cycle wear and tear. The filler 902 is mechanically durable yet somewhat flexible, reducing stresses on the cable 808 at the shell exit region.

Figure 13:
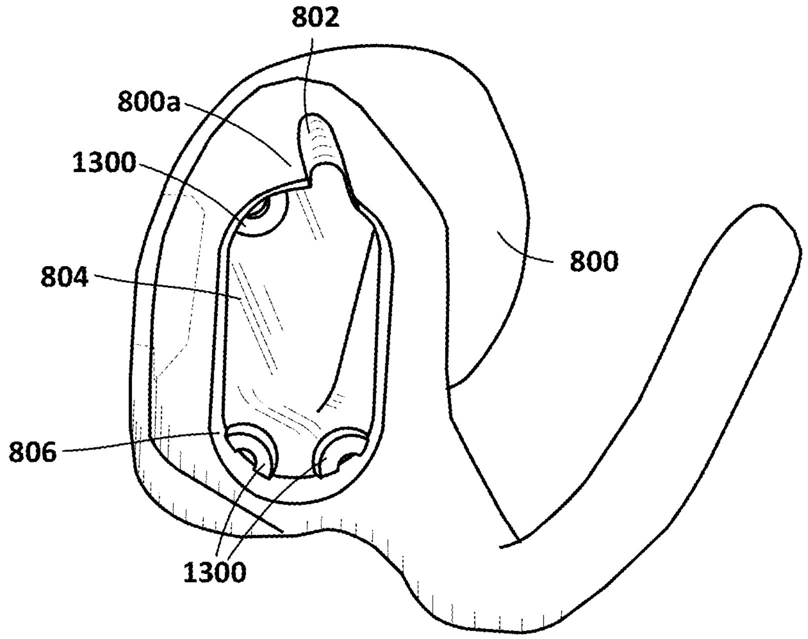
Figure 14:
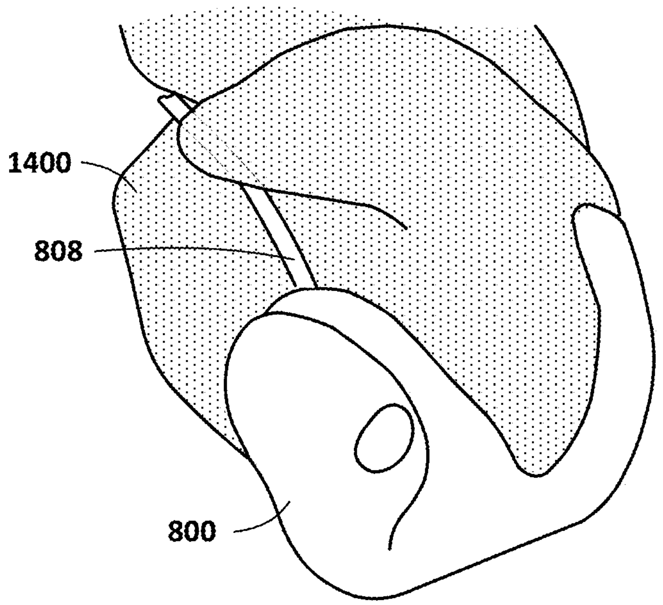

In FIG. 13, a perspective view shows the shell 800 without the faceplate or cable installed. The angle of the cable retention slot 802 can be seen relative to the outside of the shell 800. This angle generally causes the cable to curve vertically out of the shell 800 aligned with the crux of the ear. Generally, the shell 800 is part of a RIC fitting that introduces sensors into the ear. The RIC fitting is coupled to an external part, e.g., behind the ear (see, e.g., external part 106 in FIG. 1A), via electrical conductors within the cable (e.g., cable 808 in FIG. 8). Ideally, the cable 808 should run from the shell 800 to the external (behind the ear) part by a reasonably short path that follows the crux of the ear. The cable 808 should not be too short, as this could cause tension between and/or displacement of the in-ear and outside-ear components. The cable 808 should also not be too long as this increases its visibility and increases the likelihood of snagging. The angle of the cable retention slot 802 can have a significant effect on these aspects of the cable fit, and therefore the shell 800 is designed with the cable retention slot 802 being precisely located, e.g., within a few degrees of the crux of the user's ear. In FIG. 14, a perspective view shows the cable 808 extending from the shell 800 and aligned with a model 1400 of an ear (shaded regions) for which the shell 800 and cable 808 are custom fitted. Looking at the ear from the end of the canal, the cable 808 is aligned with the crux exit in the ear and where the helix attaches to the head.

Figure 15:
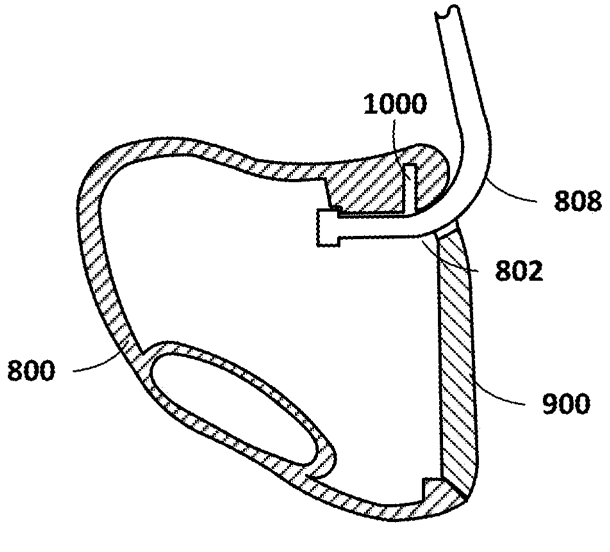
FIGS. 15 and 16 are front and side cross-sectional views showing additional cable alignment features according to an example embodiment.
Figure 16:
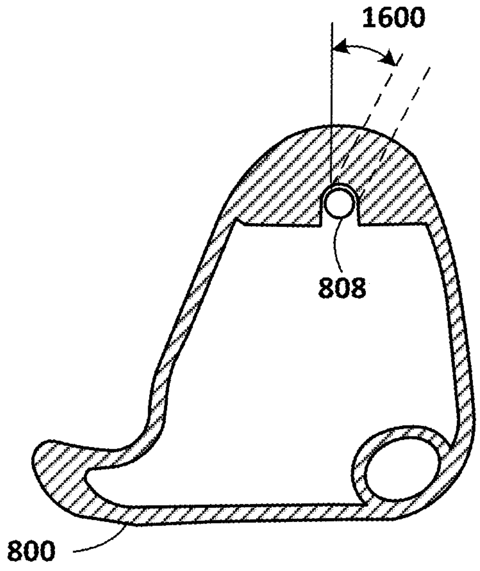
Figure 17:
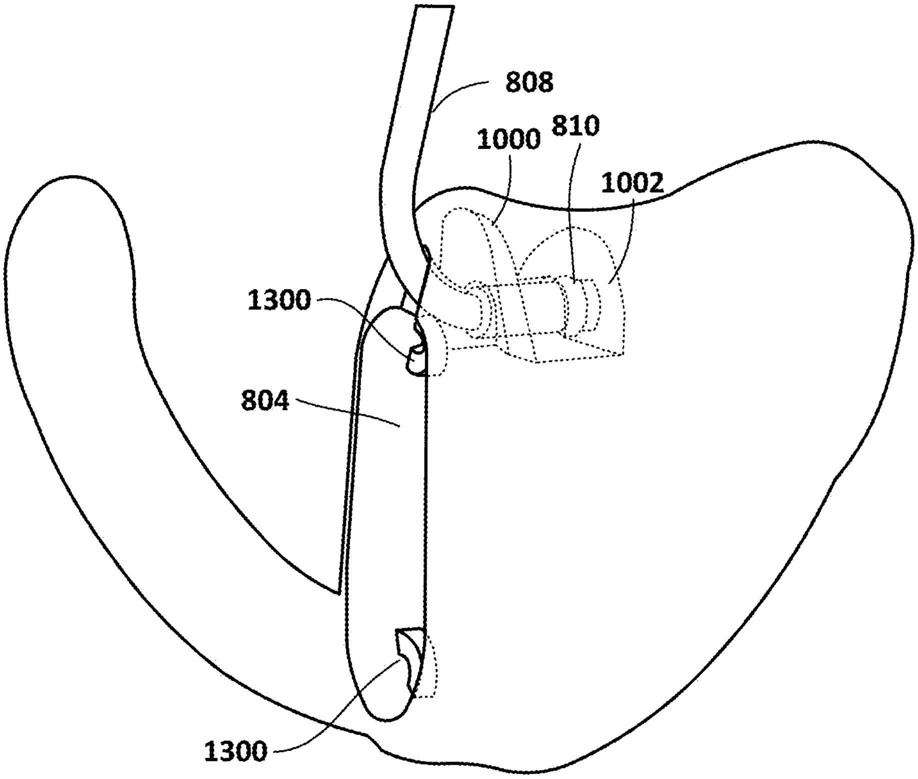
FIGS. 17-20 are perspective views showing cable and faceplate features according to an example embodiment.

In FIGS. 15 and 16, front and side cross-sectional views show additional details of the cable alignment. In FIG. 15, it can be seen how the cable retention slot 802 provides support for a 90-degree bend coming out of the shell 800. This view also shows how the faceplate 900 traps the cable 808 in place after assembly. In FIG. 16, a side view shows an angle 1600 is selected to align the cable 808 to the ear. Note that the dashed lines generally indicate the path of the cable 808 where it exits the shell 800 from the cable retention slot 802. In FIG. 17, a perspective view shows the cable 808 exiting the shell 800.

In reference again to FIG. 13, the faceplate void 804 can be seen which joins with the cable retention slot 802. A set of one or more protrusions 1300 extend from an inner surface of the shell 800 and block a part of the faceplate void 804. The one or more protrusions 1300 prevent the faceplate (e.g., faceplate 900 in FIG. 9) from passing through the faceplate void 804 and into an interior volume of the shell 800. This can help speed assembly of the faceplate 900 into the void 804.

Figure 18:
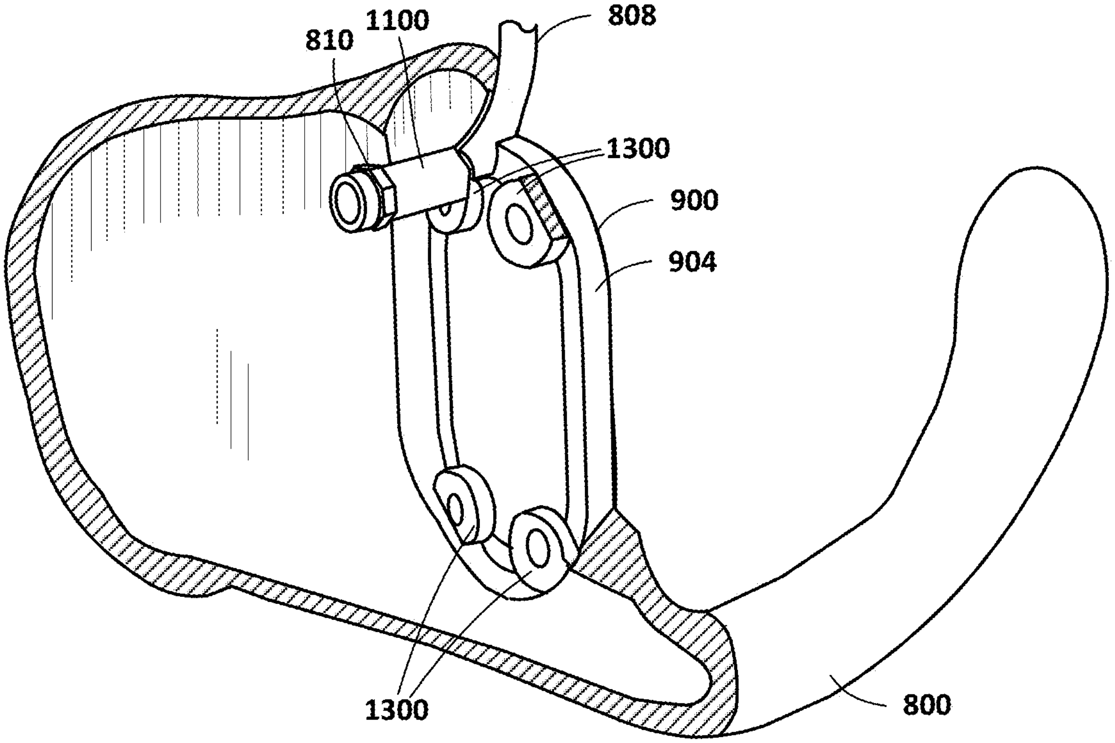

In FIG. 18, a cutaway view shows the faceplate 900 installed into the shell 800, showing how the protrusions 1300 prevent the faceplate 900 from accidentally moving into the interior volume of the shell 800. Note that when installed, the faceplate 900 does not necessarily contact the protrusions 1300. As described elsewhere herein, the faceplate 900 has beveled edges 904 that fit against a beveled perimeter edge of the faceplate void 804. This allows the faceplate 900 to be centered within the void 804 and flush with the outer surface of the shell 800 even when there are manufacturing artifacts on the beveled perimeter of the faceplate void 804. Thus, a gap between the faceplate 900 and the protrusions 1300 helps ensure there is no interference with this alignment.

Figure 19:
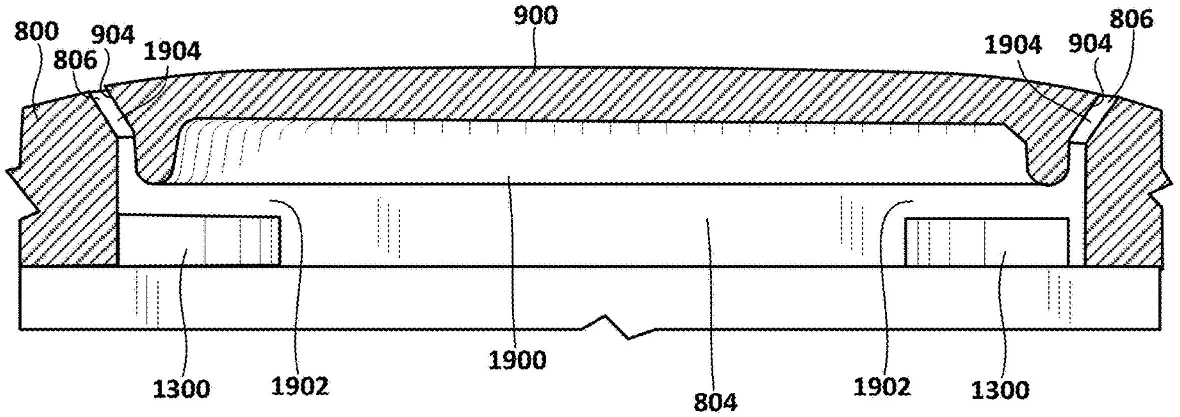
Figure 20:
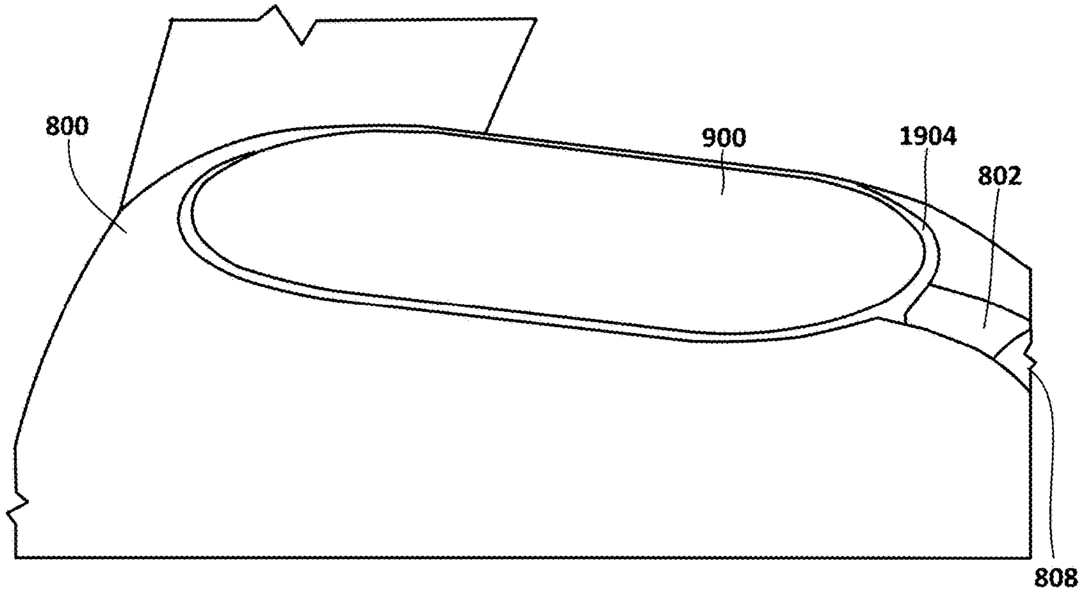

In FIG. 19, a cross-sectional view shows additional details of a faceplate 900 according to an example embodiment. The faceplate 900 is shown assembled into the shell 800. In this view a gap 1904 is shown between the beveled edge 904 of the faceplate 900 and the beveled perimeter edge 806 of the faceplate void 804. This gap 1904 would be filled with a faceplate adhesive, e.g., an ultraviolet-curable adhesive. The result is that the outer surface of the faceplate 900 is flush with the outer surface of the shell 800, which is also seen in the perspective view of FIG. 20.

As seen in FIG. 19, the faceplate 900 may include an inward-facing ridge 1900 that runs along an internal perimeter of the faceplate 900. The ridge 1900 stiffens the faceplate 900, and also defines a maximum inward protrusion of the faceplate 900 into the shell 800. The protrusions 1300 that prevent the faceplate 900 from falling through the faceplate void 804 are seen in this view, separated from the ridge 1900 by a gap 1902. The gap 1902 is defined based on a worst-case tolerance deviation of the shell 800 and faceplate 900, such that the faceplate 900 is positioned and centered in the void 804 by the beveled edge 904 of the faceplate 900 and the beveled perimeter edge 806 of the faceplate void 804, and not by contact between the ridge 1900 and the protrusions 1300.

Figure 21:
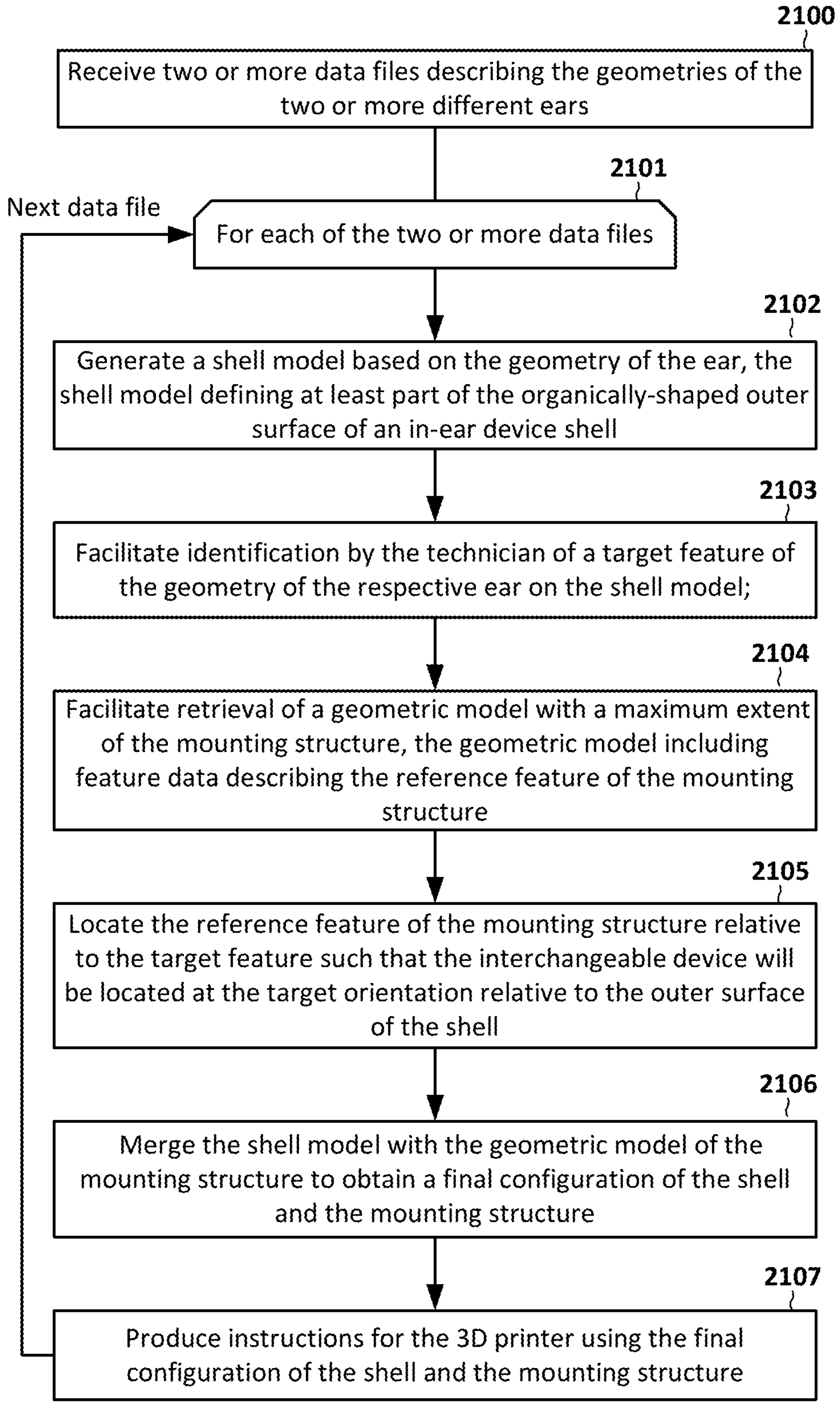
FIGS. 21 and 22 are flowcharts of methods according to example embodiments.

In FIG. 21, a flowchart shows a method for forming two or more shells having a uniquely-shaped outer surface that each corresponds a geometry of a respective one of the different ears according to another example embodiment. The method involves receiving 2100 two or more data files describing the geometries of the two or more different ears. These data files may be obtained, for example, by forming an ear mold and 3D scanning the ear mold, direct 3D scanning of the ear, etc. Loop limit block 2101 indicates operations performed for each of the two or more data files.

For each data file, a shell model is generated 2102 based on the geometry of the ear. The shell model defines at least part of the organically-shaped outer surface of the shell, e.g., at and around the ear canal. A computer-aided design terminal facilitates identification 2103 by the technician of a target feature of the geometry of the respective ear on the shell model. For example, the tragus, antitragus, crux, etc., may be identified on the ear geometry to assist in positioning mounting structures within the shell. The design terminal facilitates retrieval 2104 of a geometric model with a maximum extent of the mounting structure. The geometric model includes feature data describing the reference feature of the mounting structure.

The technician locates 2105 the reference feature of the mounting structure relative to the target feature such that an interchangeable device mounted via the mounting structure will be located at the target orientation relative to the outer surface of the shell. The shell model is merged 2106 with the geometric model of the mounting structure to obtain a final configuration of the shell and the mounting structure. Instructions for the 3D printer are produced 2107 using the final configuration of the shell and the mounting structure, and can be used to 3D print the shell.

Figure 22:
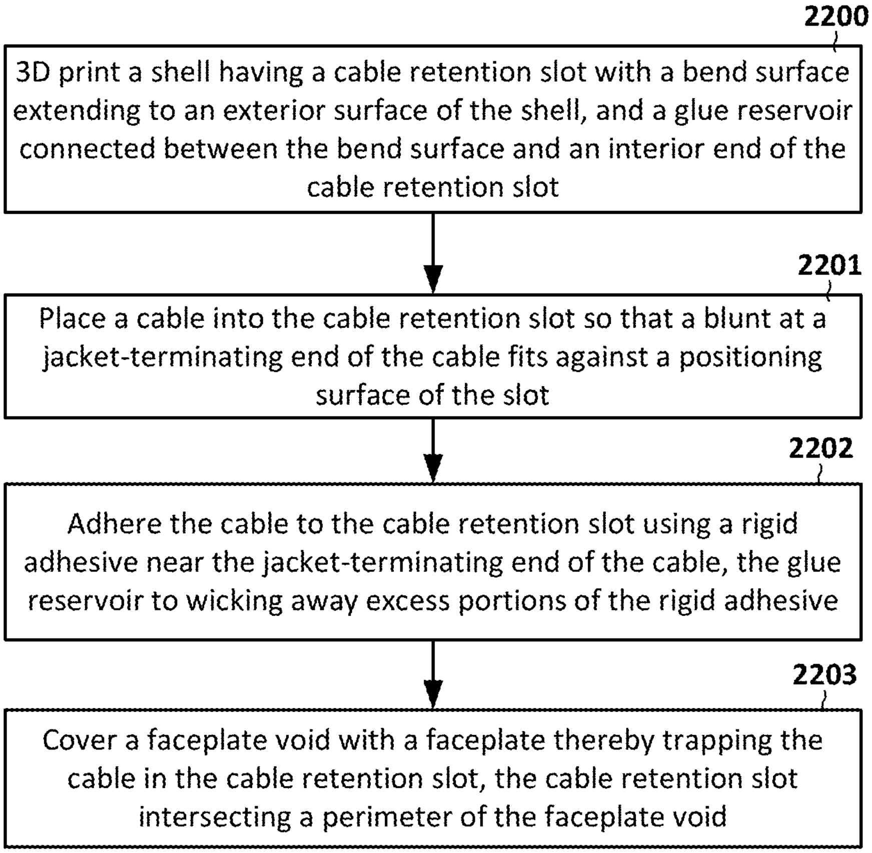

In FIG. 22, a flowchart shows a method according to another example embodiment. The method involves 3D printing 2200 a shell 3D printing a shell having a cable retention slot with a bend surface extending to an exterior surface of the shell. The shell also has a glue reservoir connected between the bend surface and an interior end of the cable retention slot. The cable retention slot intersecting a faceplate void in the shell. A cable is placed 2201 into the cable retention slot so that a blunt at a jacket-terminating end of the cable fits against a positioning surface of the slot. The cable is adhered 2202 to the cable retention slot using a rigid adhesive near the jacket-terminating end of the cable. The glue reservoir to wicks away excess portions of the rigid adhesive. The faceplate void 2203 is covered with a faceplate, which traps the cable in the cable retention slot.

Figure 23:
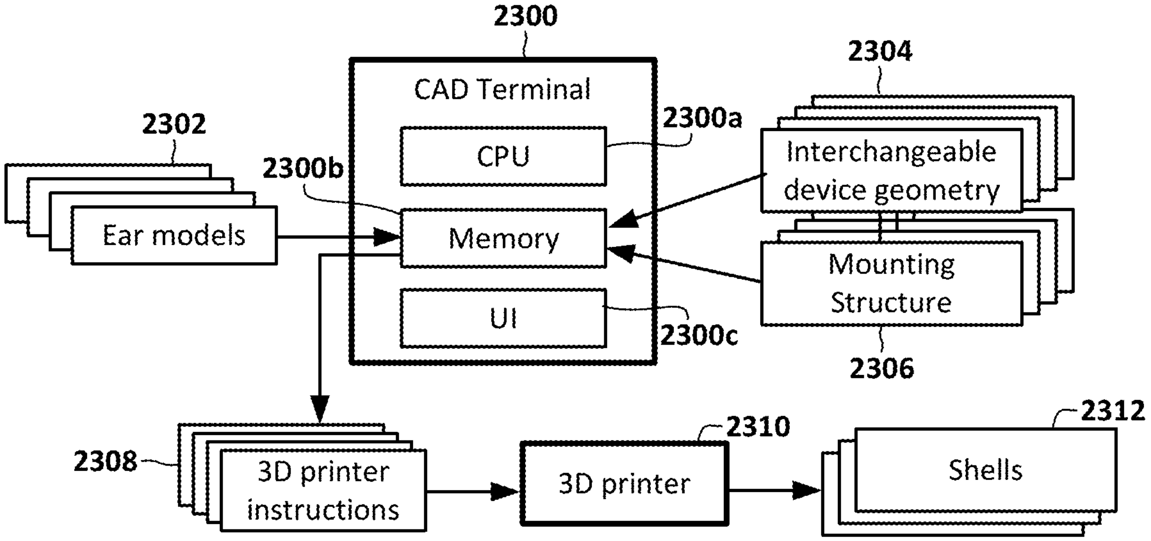
FIG. 23 is a block diagram of a system according to an example embodiment.
Figure 24:
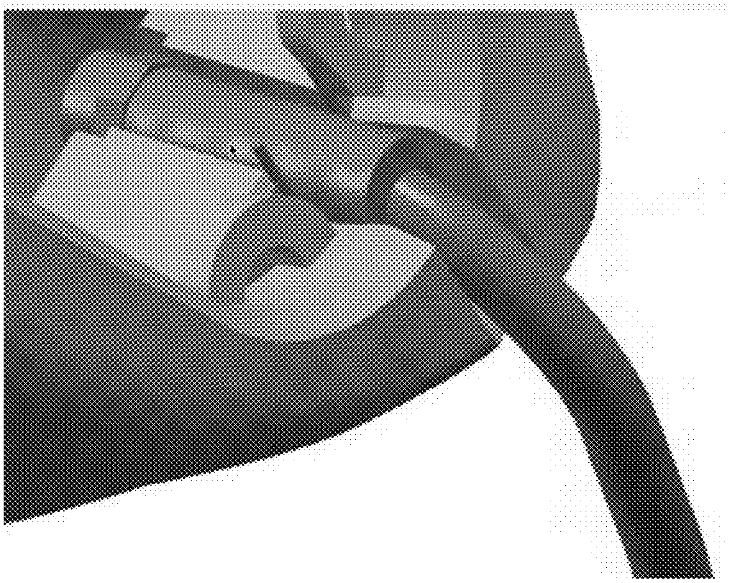
FIGS. 24-32 are three-dimensional CAD renderings and a photo that show additional details of an ear-wearable electronic device according to example embodiments.
Figure 25:
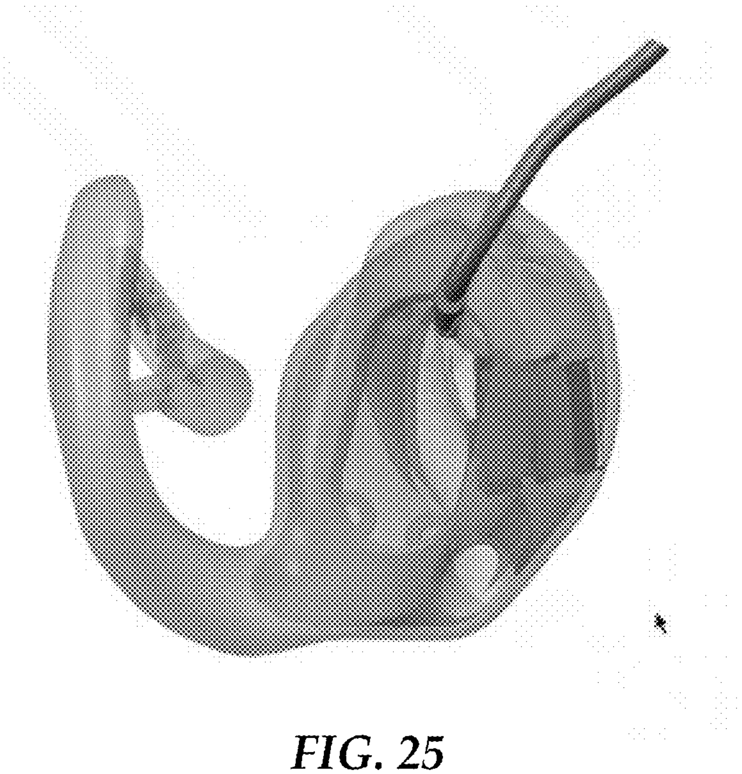
Figure 26:
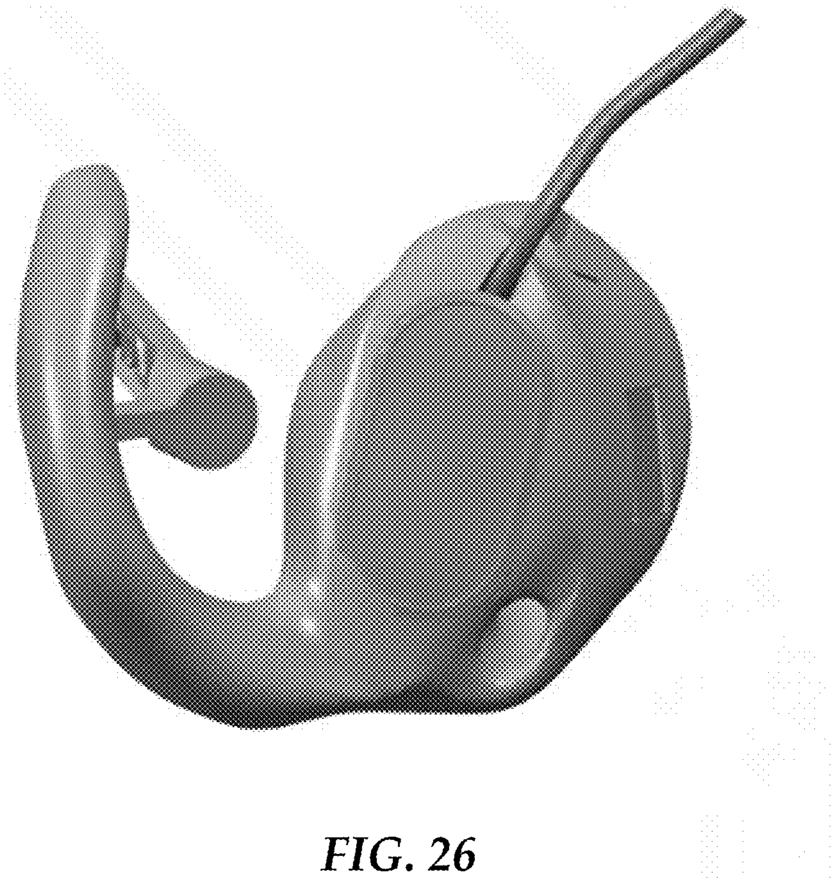
Figure 27:
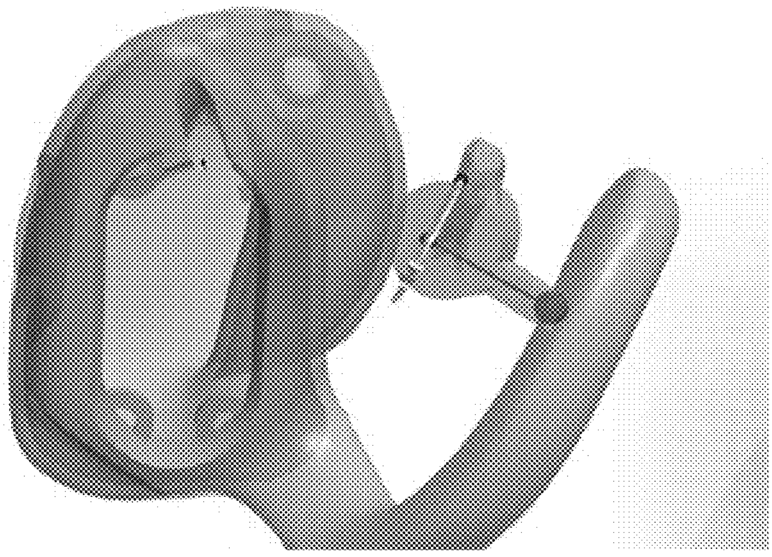
Figure 28:
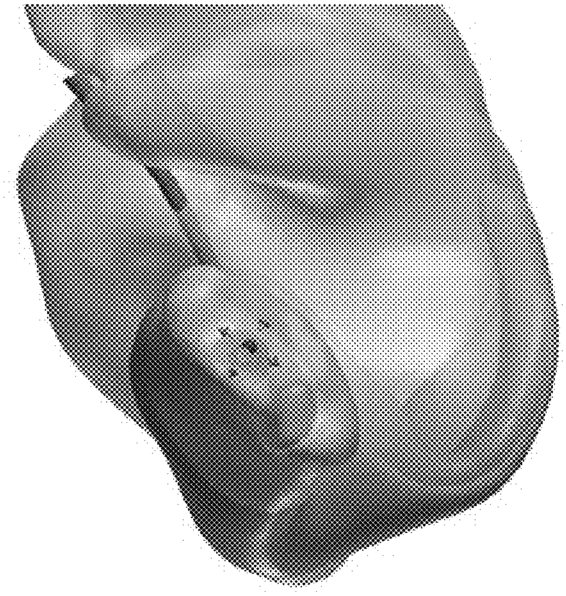
Figure 29:
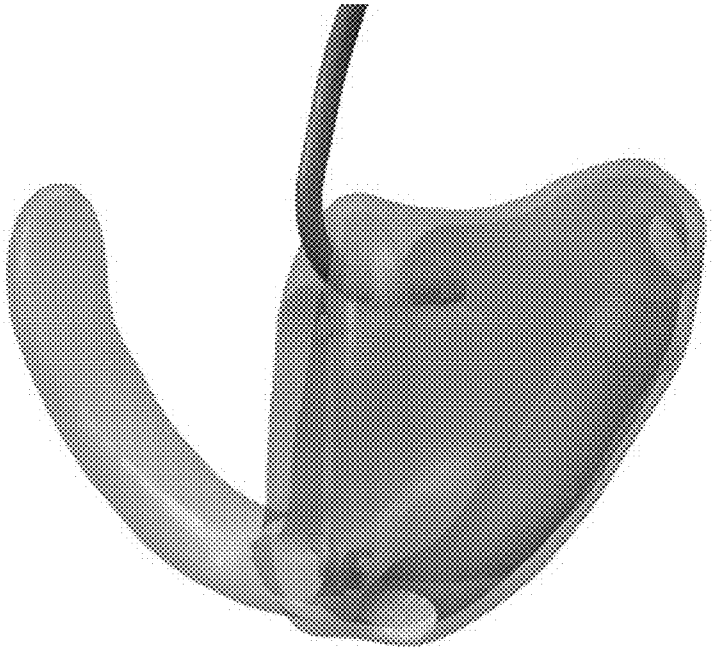
Figure 30:
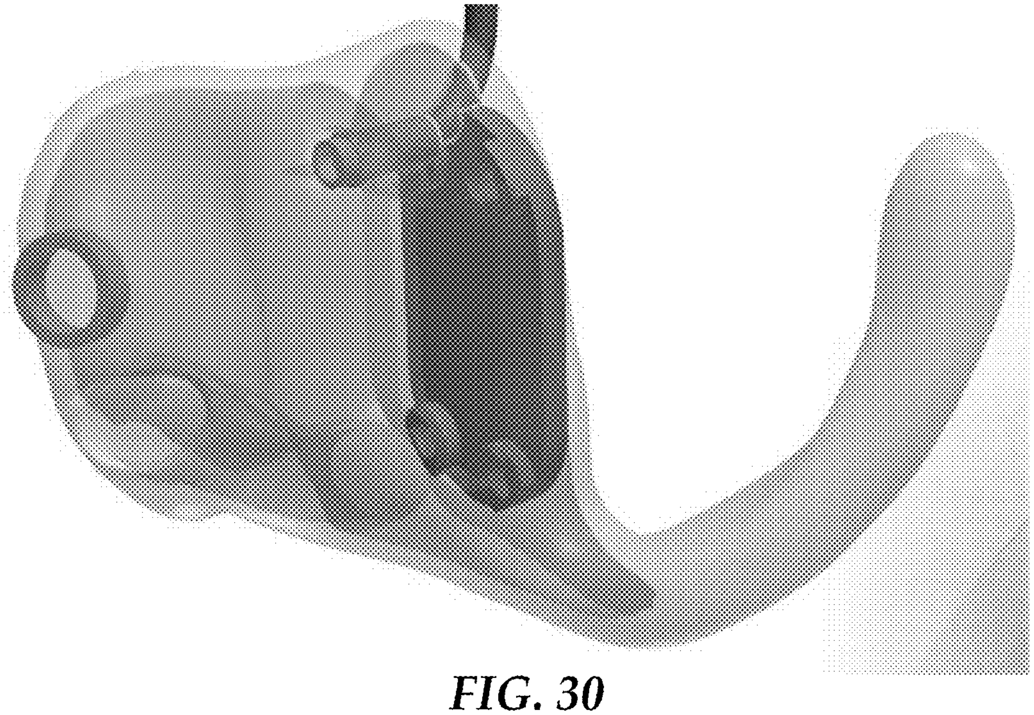
Figure 31:
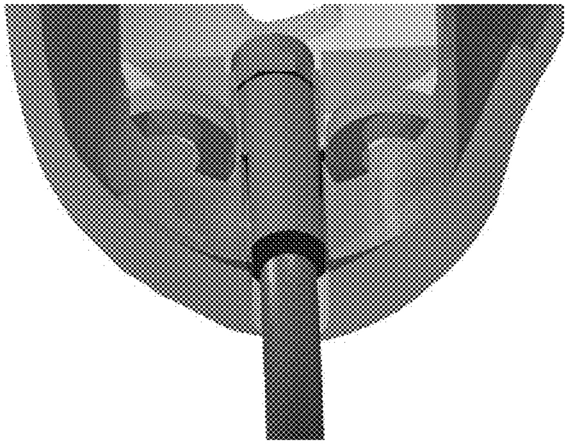
Figure 32:

In FIG. 23, a block diagram shows a system according to an example embodiment. The system includes a CAD terminal 2300, which can be used to generate geometry of custom fitted shells, e.g., with biometric integrated sensors. The terminal 2300 includes one or more processors, as represented by central processing unit (CPU) 2300*a*. Memory 2300*b* is coupled to the CPU 2300*a*, and may include volatile and non-volatile memory. The CPU 2300*a* is coupled to input-output lines, one of which is represented by user interface 2300*c*, which may include user input devices (e.g., keyboard, mouse) and output devices (e.g., monitor, virtual reality headset).

The CAD terminal 2300 is accessible by a technician and operable to receive two or more data files 2302 that describing the geometries of the two or more different ears. For example, the geometry can be scanned using a 3D scanner, and saved in a data format compatible with a CAD program running on the CAD terminal 2300. The CAD terminal 2300 may also locally or remotely store one or more geometric models 2304 of an interchangeable device, such as cable, biometric sensor, faceplate, etc. Each device model 2304 is associated with a mounting structure model 2306 that defines a maximum extent of the mounting structure, and can be used to merge with a different geometry models of a device shell that have uniquely-shaped outer surfaces that correspond a geometry of different ears.

The CAD terminal 2300 runs software that can generate a shell model based on the geometry of the ear. The shell model defines at least part of the organically-shaped outer surface of a shell. Via the user interface 2300*c*, the technician can identify a target feature of the geometry of the respective ear on the shell model. The user interface 2300*c* also facilitates locating the reference feature of the mounting structure relative to the target feature such that the interchangeable device will be located at the target orientation relative to the outer surface of the shell. The CAD terminal 2300 can then merge the shell model with the geometric model of the mounting structure to obtain a final configuration of the shell and the mounting structure.

The final configuration of the shells are used to produce the instructions 2308 for a 3D printer 2310. Each set of the instructions 2308 produces a uniquely shaped shell that is able to fit any of the interchangeable devices defined by geometry models 2304 such that the interchangeable device is located at a target orientation relative to the outer surface of the shell. The 3D printer 2310 then prints the shells 2312, which can then be used to build a hearing device as described herein.

In FIGS. 24-32, three-dimensional CAD renderings and a photo show additional details of an ear-wearable electronic device according to example embodiments. This document discloses numerous example embodiments, including but not limited to the following:

Example 1 is an ear-wearable electronic device, comprising a shell. The shell comprises: a cable retention slot, the cable entrance slot comprising an interior end and an exterior end; and a bend surface extending from the exterior end of the cable retention slot to an exterior surface of the shell, the bend surface aligned with a crux of a user's ear when the ear-wearable device is installed in an ear of the user's ear.

Example 2 includes the ear-wearable device of example 1, further comprising a cable mounted in the cable retention slot, the cable comprising a blunt at a jacket-terminating end, the blunt fitting against a positioning surface at the interior end of the cable retention slot and axially locating the cable in the shell. Example 3 includes the ear-wearable device of example 2, where the cable comprises strengthening fibers co-extruded within a jacket together with conductors, the strengthening fibers extending from the jacket-terminating end and folded back over a fiber retention region at an outside surface of the jacket, the fiber retention region being between the cable retention slot and the cable. Example 4 includes the ear-wearable device of example 3, wherein a rigid adhesive adheres the cable to the cable retention slot near the jacket-terminating end of the cable, the rigid adhesive adhering the strengthening fibers to the outside surface of the jacket at the fiber retention region.

Example 5 includes the ear-wearable device of any one of examples 3 or 4, further comprising a sensor coupled to the conductors of the cable, the sensor mounted in a void extending from an inner surface of the shell to the outer surface of the shell. Example 6 includes the ear-wearable device of any one of examples 1-5, wherein the bend surface is aligned to the crux of the user's ear within an angle of 5 degrees. Example 7 includes the ear-wearable device of any one of examples 1-6, wherein the shell further comprises: a faceplate void that has a curved and beveled perimeter edge, the faceplate void facilitating access to one or more devices installable into the shell, the cable retention slot intersecting the beveled perimeter edge; and a faceplate with a beveled edge that mates with the perimeter edge, the faceplate comprising an unbroken covering surface that matches the outer surface of the shell surrounding the faceplate void and traps the cable into the cable retention slot.

Example 9 includes the ear-wearable device of any one of examples 1-8, wherein the exterior surface of the shell intersects the bend surface at a region of the exterior surface, and wherein the region of exterior surface does not protrude toward the crux. Example 10 includes the ear-wearable device of any one of example 1-9, wherein the shell has a uniquely-shaped outer surface that corresponds uniquely to an ear geometry of a user of the ear-wearable device. Example 11 includes the ear-wearable device of example 10, wherein the ear geometry is based on a mold of an ear of the user. Example 12 includes the ear-wearable device of any one of examples 1-11, wherein the shell, the cable retention slot, and the bend surface comprise an integrally 3D printed structure.

Example 13 is an ear-wearable electronic device, comprising: a shell having a uniquely-shaped outer surface that corresponds uniquely to an ear geometry of a user of the ear-wearable device. The shell comprises: a cable retention slot, the cable entrance slot comprising an interior end and an exterior end; a bend surface extending from the exterior end of the cable retention slot to an exterior surface of the shell, the bend surface aligned with a crux of a user's ear when the ear-wearable device is installed in an ear of the user's ear; and a faceplate void that has a curved and beveled perimeter edge, the faceplate void facilitating access to one or more devices installable into the shell, the cable retention slot intersecting the perimeter edge.

Example 14 includes the ear-wearable device of example 13, further comprising a cable mounted in the cable retention slot, the cable comprising a blunt at a jacket-terminating end, the blunt fitting against a positioning surface at the interior end of the cable retention slot and axially locating the cable in the shell. Example 15 includes the ear-wearable device of example 14, further comprising a faceplate with a beveled edge that mates with the perimeter edge and that traps the cable withing the cable retention slot.

Example 16 includes the ear-wearable device of example 15, further comprising a biocompatible filler in the cable retention slot surrounding at least part of the cable and being flush with the covering surface of the faceplate and the outer surface of the shell. Example 17 includes the ear-wearable device of any one of examples 14-16, further comprising a sensor coupled to conductors of the cable, the sensor mounted in a void extending from an inner surface of the shell to the outer surface of the shell.

Example 18 includes the ear-wearable device of any of examples 13-17, wherein the bend surface is aligned to the crux of the user's ear within an angle of 5 degrees. Example 19 includes the ear-wearable device of any one of examples 13-18, wherein the exterior surface of the shell intersects the bend surface at a region of the exterior surface, and wherein the region of exterior surface does not protrude toward the crux. Example 20 includes the ear-wearable device of any of examples 13-19, wherein the ear geometry is based on a mold of an ear of the user.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. An ear-wearable electronic device, comprising:

a shell comprising:

- a cable retention slot, the cable entrance slot comprising an interior end and an exterior end; and
- a bend surface extending from the exterior end of the cable retention slot to an exterior surface of the shell, the bend surface aligned with a crux of a user's ear when the ear-wearable device is installed in an ear of the user's ear.

2. The ear-wearable device of claim 1, further comprising a cable mounted in the cable retention slot, the cable comprising a blunt at a jacket-terminating end, the blunt fitting against a positioning surface at the interior end of the cable retention slot and axially locating the cable in the shell.

3. The ear-wearable device of claim 2, where the cable comprises strengthening fibers co-extruded within a jacket together with conductors, the strengthening fibers extending from the jacket-terminating end and folded back over a fiber retention region at an outside surface of the jacket, the fiber retention region being between the cable retention slot and the cable.

4. The ear-wearable device of claim 3, wherein a rigid adhesive adheres the cable to the cable retention slot near the jacket-terminating end of the cable, the rigid adhesive adhering the strengthening fibers to the outside surface of the jacket at the fiber retention region.

5. The ear-wearable device of claim 3, further comprising a sensor coupled to the conductors of the cable, the sensor mounted in a void extending from an inner surface of the shell to the outer surface of the shell.

6. The ear-wearable device of claim 1, wherein the bend surface is aligned to the crux of the user's ear within an angle of ±5 degrees.

7. The ear-wearable device of claim 1, wherein the shell further comprises:

- a faceplate void that has a curved and beveled perimeter edge, the faceplate void facilitating access to one or more devices installable into the shell, the cable retention slot intersecting the beveled perimeter edge; and
- a faceplate with a beveled edge that mates with the perimeter edge, the faceplate comprising an unbroken covering surface that matches the outer surface of the shell surrounding the faceplate void and traps the cable into the cable retention slot.

8. The ear-wearable device of claim 1, wherein the exterior surface of the shell intersects the bend surface at a region of the exterior surface, and wherein the region of exterior surface does not protrude toward the crux.

9. The ear-wearable device of claim 1, wherein the shell has a uniquely-shaped outer surface that corresponds uniquely to an ear geometry of a user of the ear-wearable device.

10. The ear-wearable device of claim 9, wherein the ear geometry is based on a mold of an ear of the user.

11. The ear-wearable device of claim 1, wherein the shell, the cable retention slot, and the bend surface comprise an integrally 3D printed structure.

12. An ear-wearable electronic device, comprising: a shell having a uniquely-shaped outer surface that corresponds uniquely to an ear geometry of a user of the ear-wearable device, the shell comprising: a cable retention slot, the cable entrance slot comprising an interior end and an exterior end; a bend surface extending from the exterior end of the cable retention slot to an exterior surface of the shell, the bend surface aligned with a crux of a user's ear when the ear-wearable device is installed in an ear of the user; and a faceplate void that has a curved and beveled perimeter edge, the faceplate void facilitating access to one or more devices installable into the shell, the cable retention slot intersecting the perimeter edge.

13. The ear-wearable device of claim 12, further comprising a cable mounted in the cable retention slot, the cable comprising a blunt at a jacket-terminating end, the blunt fitting against a positioning surface at the interior end of the cable retention slot and axially locating the cable in the shell.

14. The ear-wearable device of claim 13, further comprising a faceplate with a beveled edge that mates with the perimeter edge and that traps the cable withing the cable retention slot.

15. The ear-wearable device of claim 14, further comprising a biocompatible filler in the cable retention slot surrounding at least part of the cable and being flush with the covering surface of the faceplate and the outer surface of the shell.

16. The ear-wearable device of claim 13, further comprising a sensor coupled to conductors of the cable, the sensor mounted in a void extending from an inner surface of the shell to the outer surface of the shell.

17. The ear-wearable device of claim 12, wherein the bend surface is aligned to the crux of the user's ear within an angle of ±5 degrees.

18. The ear-wearable device of claim 12, wherein the exterior surface of the shell intersects the bend surface at a region of the exterior surface, and wherein the region of exterior surface does not protrude toward the crux.

19. The ear-wearable device of claim 12, wherein the ear geometry is based on a mold of an ear of the user.

* * * * *